April 16, 1940.  M. H. GOLDBERG  2,197,637
COLOR WAVE PROJECTOR
Filed April 14, 1937   2 Sheets-Sheet 1
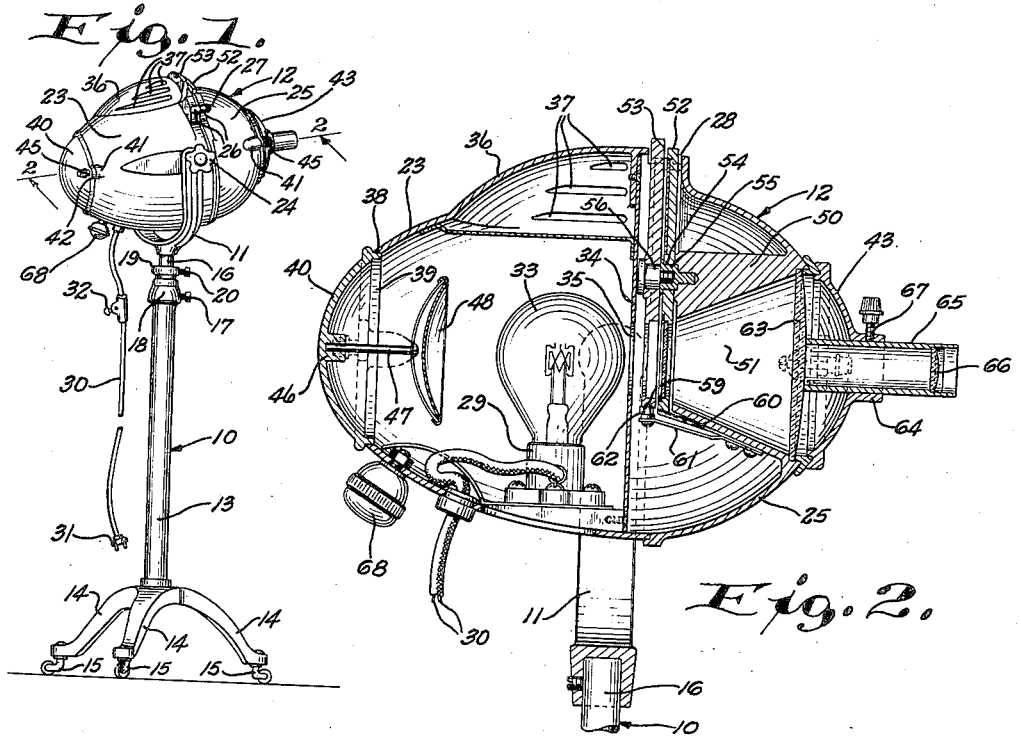
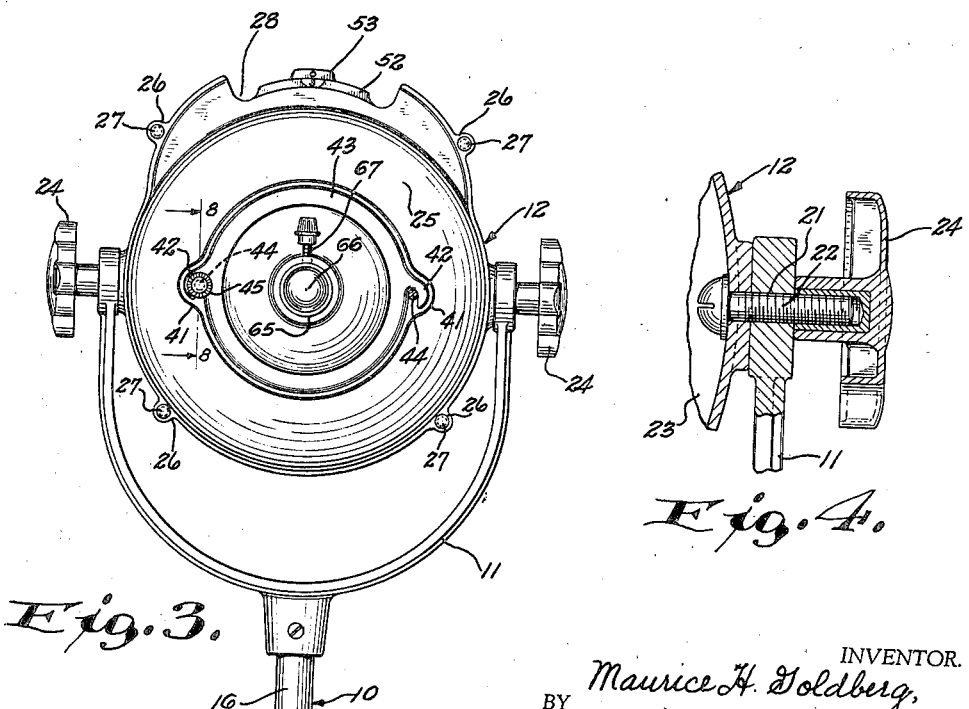
INVENTOR.
Maurice H. Goldberg,
BY Morsell, Lieber & Morsell
ATTORNEYS.

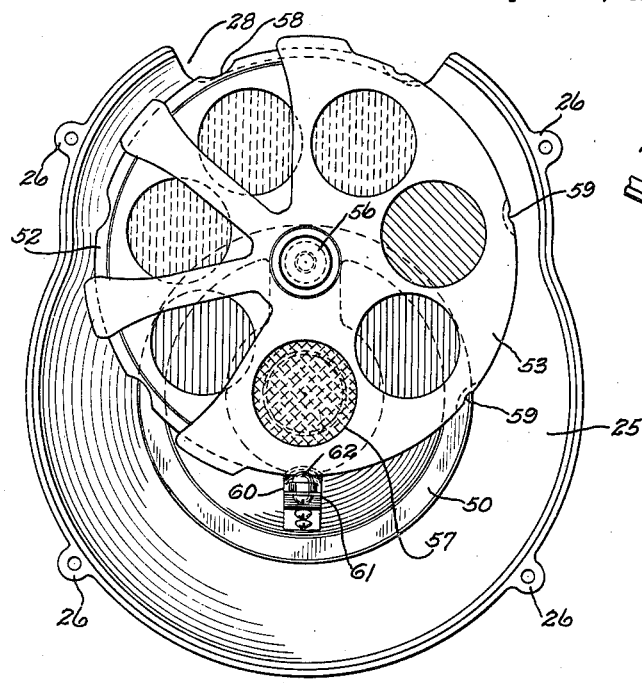
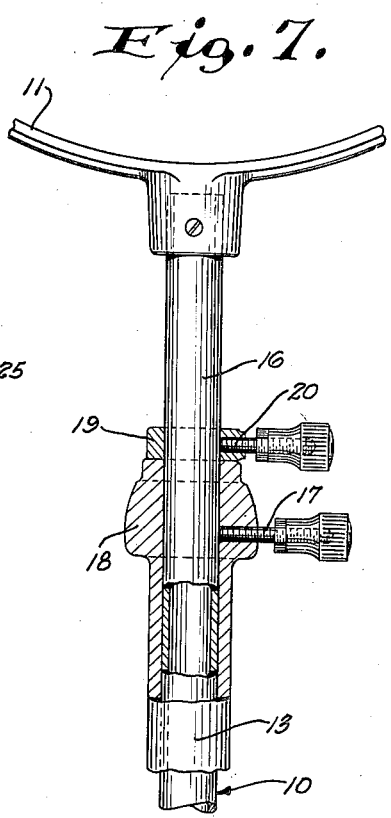
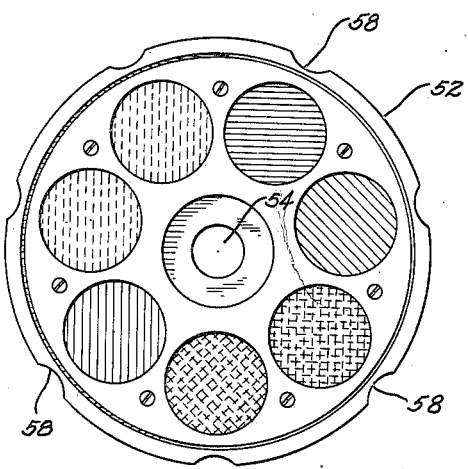
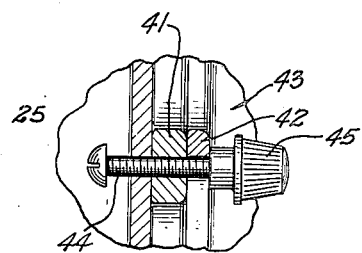

Patented Apr. 16, 1940

2,197,637

UNITED STATES PATENT OFFICE 2,197,637

COLOR WAVE PROJECTOR

Maurice H. Goldberg, Chicago, Ill.

Application April 14, 1937, Serial No. 136,715

1 Claim. (Cl. 240—1)

This invention relates to improvements in color wave projectors, and more particularly to a color wave projection apparatus for therapeutic uses, among other things.

It is a general object of the present invention to provide an improved form of therapeutic apparatus adapted for the projection of color waves emanating from selected portions of the spectrum for use in the treatment of diseases and human ailments.

A specific object of the invention is to provide a therapeutic apparatus equipped with a pair of selectively registrable colored glass carrying members through either or both of which light rays from a source are projected, one of said members having individual colored glass windows corresponding with the seven colors of the spectrum and the other of said members having one or more open windows and also three colored glass windows corresponding with the three primary colors of the spectrum, whereby through individual use of the colors of one of said members, or the combination of any of the same with any of those of the other member, a great many shades of color waves may be projected from the apparatus.

A further object of the invention is to provide a color wave projector in which the incandescent bulb or light source is so mounted, housed, and associated with the other elements that a large amount of the light therefrom is utilized, whereby the apparatus requires a bulb of less wattage than that used in other forms of competitive apparatus.

A further object of the invention is to provide a color wave projector wherein both direct and reflected light rays from the housed source are passed through the colored windows and then through a lens or condenser.

A further object of the invention is to provide a color wave projector in which the mechanism within the projector is extremely accessible for repairs and replacements and wherein the reflector is rigidly mounted on a removable rear cover member which affords easy and convenient access to the incandescent bulb.

A further object of the invention is to provide a color wave projector which can be arranged to project local, condensed light areas or relatively large, diffused light areas of any selected color.

A further object of the invention is to provide a color wave projector wherein the color windows are of glass which are solidly colored throughout instead of being only surface colored.

A further object of the invention is to provide a therapeutic apparatus of the character described in which the standard is circularly and vertically adjustable and in which the projector casing is angularly adjustable relative to the standard, whereby the entire apparatus is susceptible of universal adjustments.

A further object of the invention is to provide a therapeutic apparatus which is neat and attractive in appearance, which is easily manipulated and adjusted, which is strong and durable, and which is well adapted for the purposes described.

With the above and other objects in view, the invention consists of the improved therapeutic apparatus, and its parts and combinations as set forth in the claim, and all equivalents thereof.

In the accompanying drawings in which the same reference characters indicate the same parts in all of the views:

Fig. 1 is a perspective view of the improved therapeutic apparatus;

Fig. 2 is an enlarged vertical sectional view of the projector casing indicated on line 2—2 of Fig. 1;

Fig. 3 is an enlarged front view of the projector casing and a portion of the standard;

Fig. 4 is an enlarged fragmentary, detail sectional view showing the adjustable connection between a side of the projector casing and an end of a supporting yoke;

Fig. 5 is a rear face view of the front section of the projector as removed from the complementary section and showing the mounting of the color window members, and on a larger scale;

Fig. 6 is a detail view of a face of the color dial;

Fig. 7 is an enlarged, fragmentary view of the supporting standard, with portions broken away and in section to show details of construction; and Fig. 8 is an enlarged, detail sectional view taken on line 8—8 of Fig. 3.

Referring now more particularly to the drawings, it will appear that the improved therapeutic apparatus includes in general an adjustable standard 10 having a yoke 11 at its upper end on which is tiltably mounted a projector casing 12.

The standard 10 includes an outer tubular column 13 formed with angularly spaced apart and outwardly and downwardly directed legs 14 at its lower end. The extremities of the legs 14 carry swivelingly mounted casters 15. Adjustably mounted within the tubular column 13 and extending out of the upper open end thereof is a tubular post 16. The post 16 is turnable within the column 13 so that circular or angular adjustments in a horizontal plane, of the casing 12, may be attained. For securing the post 16 in a position of adjustment, a clamping bolt 17 is provided which is threaded through a side wall portion of an enlarged boss 18 integral with the upper end of the column 13. When the bolt 17 is turned inwardly so as to impinge against the post 16, the post is of course secured in adjusted position, and when the bolt is loosened the post may be freely turned.

Due to the telescoping of the post 16 within the column 13, it is obvious that the height of the entire standard may of course be varied or adjusted. For this purpose there is provided a collar 19 surrounding an upper portion of the post 16 and adapted to be clamped to a selected portion of the post by means of a clamping bolt 20 threaded through the collar and adapted to releasably impinge against the post 16. When said collar is secured to the post 16, at a desired elevation, the post 16 can telescope relative to the column 13 to an extent only afforded by engagement of the collar 19 on the upper end of the column boss 18.

The lower portion of the yoke 11 is mounted fast on the upper portion of the post 16. The ends of the arms of the yoke are formed on their inner surfaces as bearing faces, and said portions are apertured as at 21 to receive pivot bolts 22. Said pivot bolts are extended through opposite side wall portions of the rear section 23 of the projector casing 12 and are headed adjacent the inner surfaces of the section 23 and have their shank portions extended laterally outwardly of the yoke ends. These projecting shank portions have threaded thereon clamping knobs 24. When the knobs 24 are loosened relative to the pivot bolts 22, the entire projector casing 12 may pivot on the inner ends of the shanks of said bolts and it may therefore be adjusted to a desired angular position, such adjustments being in a vertical plane. When the casing is so adjusted the knobs 24 must be tightened and the clamping effect so attained secures the casing in adjusted position.

The projector casing 12 is formed as a shell and is generally of oval form and is of circular cross section. The casing is composed of two complementary sections 23 and 25, and the meeting edge portions of said complementary sections 23 and 25 are provided with mating tapped lugs 26 through which bolts 27 are extended, whereby said sections are releasably held together to form a complete enclosure. The upper portion of the sectional casing is formed with an arc shaped slot 28 through which upper peripheral portions of revoluble color window members project as will hereinafter appear.

Within the rear section 23 of the casing and mounted on the lower wall portion thereof toward the front end, is an electrical socket 29 to which current is supplied from any suitable source by circuit wires 30 which extend outwardly of the casing. Said circuit wires carry a plug 31 at their outer ends whereby the wires may be plugged into any convenient electrical outlet. Carried by the wires 30 is a snap switch 32 of a desired form which may be operated to open or close the circuit to the socket 29. The socket 29 has mounted therein within the casing an incandescent bulb 33 of a desired intensity. Said incandescent bulb is positioned just rearwardly of a wall 34 which closes the front of the casing section 23. Said wall is, however, provided with a circular opening 35 located immediately adjacent the bulb and which permits light rays to pass in a restricted manner toward the forward end of the projector casing. Over the incandescent bulb the casing section 23 is arched somewhat as at 36, and said arched portion is provided with vent slots 37 to aid in the dissipation of heat generated within the casing by virtue of operation of the bulb 33.

An important feature of the present invention is the arrangement whereby access to the interior of the casing section 23 and the incandescent bulb 33 may be readily had. For this purpose the rear end of the casing 23 is provided with a circular opening 38 of a substantial size, and said opening closely receives the annular flange 39 of a rear cover 40. The exterior of the casing section 23, at opposite sides of the rear opening 38, is formed with boss portions 41 to receive apertured ears 42 on the cover 40. The removable mounting of the rear cover is the same as that for a front cover 43, which arrangement is shown most clearly in Figs. 3 and 8. The apertures in the ears 42 of the cover are downwardly slotted to removably engage threaded studs 44 which extend inwardly through the bosses 41 and into the casing. The inner ends of the studs 44 are headed so as to prevent removal of the same, and the outer ends of the studs 44 carry fast thereon knurled knobs 45 for turning purposes. To remove a cover 40 or 43, the knobs 45 are turned in a direction to remove the same from impingement against the cover lugs or ears, and thereafter the cover member may be raised upwardly and then outwardly to disengage it from the shanks of the studs 44, thereby effecting complete removal of the cover member from its casing section. The studs 44 are not removed during this procedure, and hence cannot be lost or misplaced.

With specific relation to the rear cover 40 which closes the rear end of the casing section 23, it should be observed that on its inner face there is an inwardly directed boss 46 which has anchored therein an end of a stem 47 which supports on its other end a concave polished reflector 48. The normal disposition of said reflector 48 is rearwardly of the incandescent bulb 33 and in alinement with the partition opening 35. It is, therefore, obvious that when the rear cover 40 is removed as heretofore described, the connected reflector is likewise removed, and then complete access to the socket 29 and incandescent bulb 33 is readily afforded. This insures ease in replacing the incandescent bulb when necessary.

The front section 25 of the casing is provided with an internal shell 50 having an open ended cavity 51 therein, which cavity is in the form of a section of a cone with its narrow end directed toward the rear of the section and in registration with and spaced from the circular opening 35 in the wall or partition 34. The reduced end of the cavity 51 is likewise adapted to be in registration with selected windows in a color window dial 52 and a color window sector 53, both of which are revolubly mounted in superimposed relation within the rear end of the casing section 25 adjacent the shell 50 and between the latter and the partition 34. The upper peripheral portions of the color window members 52 and 53 are adapted to project through the casing slot 28 for access in manually turning the same.

The color window dial 52 is shown in detail in Fig. 6, and it will appear that the same is provided with seven windows arranged in circular formation with each window being closed by or having secured therein a colored glass member. The peripheral portions of the dial 52, outwardly of each window, has marked thereon numbers ranging from one to seven, both inclusive, and the glasses in the respective windows are colored to correspond with the seven colors of the spectrum. For instance, the window opposite which the dial has the designation (1) has red glass therein and the successive windows thereafter are colored orange, yellow, green, blue, indigo, and violet. The central portion of the dial is provided with a circular aperture 54 in which is lodged the enlarged portion of a pivot stud 55, and the reduced shank portion of the stud 55 is threaded onto an adjacent part of the shell 50. Hence the dial 52 may turn on the enlarged portion of the stud 55. The enlarged portion of the stud 55 is formed with an internally threaded tapped opening to receive the threaded shank portion of another pivot stud 56 on the enlarged portion of which the color window sector 53 is revolubly mounted in superimposed relation relative to the dial 52 and immediately rearwardly thereof.

The color sector 53 is best shown in Fig. 5, and it is provided with three spaced-apart colored glass windows with the glass in the same corresponding to the primary colors of the spectrum, namely red, green, and violet. A fourth window 57 is open. As shown in Fig. 3, peripheral portions of the sector extend outwardly of the casing slot 28 slightly above the dial 52, and on said projecting portions adjacent each window in the sector are numerical designations as follows: (O) for the open window, (1) for the red window, (4) for the green window; and (7) for the violet window. It should be observed at this point that the glass windows in both of the members 52 and 53 are solidly colored throughout, and the coloring in the windows is not mere surface coloring.

Peripheral portions of the dial 52, outwardly of each window, are formed with recesses 58 and peripheral portions of the sector 53, outwardly of each window, are formed with smaller recesses 59. For yieldably retaining both the dial 52 and the sector 53 in proper adjusted positions, a pair of spring elements 60 and 61 have their inner ends secured to a lower portion of the shell 50. The yieldable outer ends of the spring elements 60 and 61 terminate adjacent lower peripheral portions of the members 52 and 53 respectively, and the member 60 is curved at its extremity to lodge in any of the recesses 58 of the member 52, while the extremity of the spring element 61 carries an upwardly directed stud 62 to lodge within any of the recesses 59 of the sector 53.

It will be apparent that either the dial 62 or the sector 53, or both, may be turned so as to bring predetermined windows into position at the lowermost portions of the members 52 and 53 and in registration with the partition opening 35 and the tapered end of the cavity 51. If the open window of the sector 53 is thus positioned, the projector will then be effective to project colored light waves through any selected colored glass window brought into proper position of the dial 52. Or, if desired, a great many different color combinations are possible by bringing any of the colored glass windows of the member 53 into registration with any selected colored glass window of the member 52. It is also obvious from the explanation thus far that both direct and reflected light rays from the incandescent bulb 33 will pass through the wall opening 35 and from thence through the selected and registering windows in the members 52 and 53, and then into the conical cavity 51 which becomes enlarged toward its outer end so as to permit slight diffusion of the light waves.

Within the enlarged end of the shell cavity 51 there is secured a large lens condenser 63. The front cover member 43 of the casing section 25 has a tubular projection 64 in which there is adjustably mounted a tube 65 which has its inner end extended adjacent the central portion of the large lens condenser 63. The outer end portion of the tube 65 has secured therein a small lens condenser 66. The tube 65 is releasably retained in any adjusted position by means of a clamping bolt 67.

When the device is to be used for therapeutic treatments, or for the treatment of a particular disease, the patient is positioned in a comfortable position forwardly of the front end of the projector casing; and through adjusting the height of the standard and turning the casing to the proper position and tilting it at the right angle, the front light emitting end of the projector may be directed toward the portion of the patient's body which is to be subjected to treatment. A knob 68 depending from the rear section of the casing permits it to be manually moved to the desired position of adjustment. Prior to or after adjustment of the projector to the proper position, it must be determined what color waves are to be projected onto the patient for treatment. When the proper color is determined, the members 52 and 53 are turned so as to correctly position, with relation to the light bulb and light ray openings, the proper colored windows so that when the circuit wires 30 are plugged into the source and the switch 32 is moved to close the circuit, the incandescent bulb 33 will be illuminated and the proper color waves will be projected through the forward end of the apparatus. If a small local area on the patient is to be subjected to the light rays and the light rays are to be condensed, it is then desirable to leave the lens tube 65 in substantially the position shown in Fig. 2. On the other hand it may be desirable not to have the color waves of such a condensed nature for the treatment of a local area, and in that case the lens tube 65 may be removed. Another alternative method of treatment, where it is desired to direct diffused rays over a larger area, is to entirely remove the front cover member 43, and in that case the light, after passing through the large condenser 63, is projected from the uncovered opening at the front of the casing section 25 in a diffused manner.

From the foregoing description it will be apparent that the improved color wave projector is susceptible of universal adjustments and may be readily handled and manipulated so as to treat a patient in the most effective manner. Substantially all of the light from the incandescent bulb 33 is utilized either by direct projection of the rays or by reflected projection, and by virtue of the cooperating color window members 52 and 53, a great variety of colored light rays are obtainable. The members 52 and 53 may be adjusted in a very simple and convenient manner so as to attain proper location of selected color glass windows, and the members 52 and 53 are releasably maintained in selected positions of adjustment. The apparatus has the additional advantage of permitting the use of either condensed local light areas or larger diffused areas, and all of the interior mechanism within the projector casing is readily accessible for repairs and replacements. Either of the lenses 63 or 66 may be reached for cleaning, and by the easy removal of the rear cover 40 the reflector is immediately accessible as is the entire interior of the rear section of the casing including the bulb 33. By separating the two casing sections 23 and 25 and removal of the latter section, access may be had to the color window members, and either or both of the same may be removed from their mountings by unscrewing the studs 56 and 55. The apparatus is furthermore of simple and novel construction and is well adapted for the purposes set forth.

What is claimed as the invention is:

In a color wave projection apparatus casing formed with a light emitting opening in the front end thereof, a compartment entrance in the rear end thereof, and a slot in a top wall portion thereof, a removable cover disc normally closing the compartment entrance, an opaque partition within the casing intermediate its ends and forming rearwardly thereof an enclosed incandescent bulb compartment, there being a light emitting opening in the partition alined with the front end opening, an incandescent bulb removably mounted within said compartment, means for illuminating said bulb, a reflector within said compartment, a rod on which said reflector is mounted and carried directly by said cover, a pair of superimposed and independently revoluble color window members mounted within the casing forwardly of the partition and having edge portions projecting through said casing slot, one of said members having colored glass windows therein corresponding to the various colors of the spectrum, and the other of said members having an uncolored window and several additional windows, which latter windows correspond in color to the primary colors of the spectrum, peripheral portions of said members being exteriorly accessible through said casing slot to turn the same to bring selected windows in said members into registration with said light emitting openings and to superimpose in said position any window of one of said members on any window of the other of said members for the attainment of various color combinations, and yieldable means for releasably holding each of said color window members in any selected position of adjustment.

MAURICE H. GOLDBERG.